Figure 10:
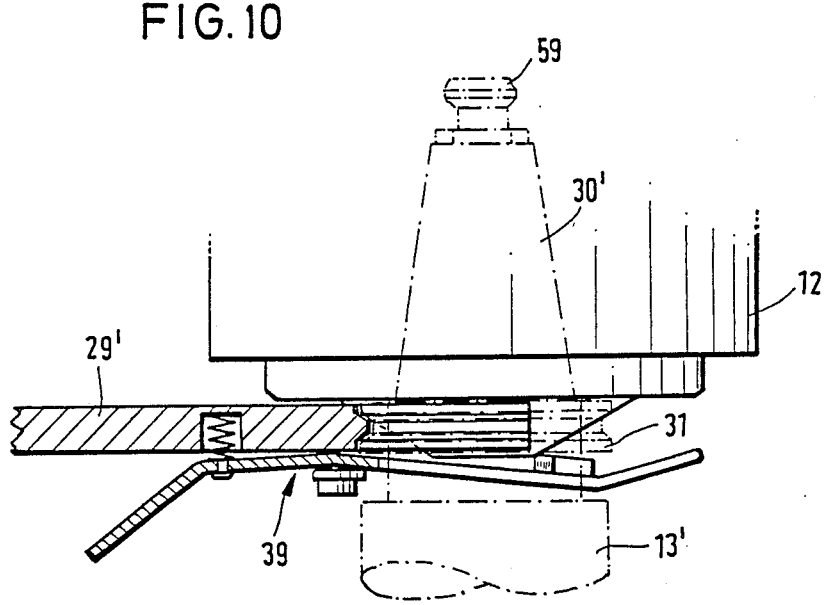

United States Patent [19]

Rupp

[11] Patent Number: 4,761,877
[45] Date of Patent: Aug. 9, 1988

[54] TOOL CHANGER FOR MACHINE TOOL

[75] Inventor: Peter Rupp, Düsseldorf, Fed. Rep. of Germany

[73] Assignee: Gebruder Honsberg GmbH, Reimscheid, Fed. Rep. of Germany

[21] Appl. No.: 92,441

[22] Filed: Sep. 3, 1987

[51] Int. Cl.⁴ .............................................. B23Q 3/157
[52] U.S. Cl. .................................... 29/568; 279/1 TS
[58] Field of Search ......................... 29/568; 279/1 TS

[56] References Cited

U.S. PATENT DOCUMENTS

| | | | |
|---|---|---|---|
| 4,122,598 | 10/1978 | Pegler et al. .......................... | 29/568 |
| 4,338,709 | 7/1982 | Straub et al. .................... | 29/26 A X |
| 4,581,811 | 4/1986 | Eckle ..................................... | 29/568 |

*Primary Examiner*—Gil Weidenfeld
*Assistant Examiner*—Steven C. Bishop
*Attorney, Agent, or Firm*—Spensley Horn Jubas & Lubitz

[57] ABSTRACT

The tool changer comprises a plurality of gripper hands (29) adapted to be moved laterally to the flange (31) of a tool (13). The gripper hand is provided with a locking means (39) which is unlocked by a connecting link guide (49) when the gripper hand is at the tool holding fixture (12). Said locking means (39) supports locking elements (48) protecting the flange (31) at the gripper hand from being extracted. Due to a wrench (51), the shaft (30) of the tool (13) is released and locked inside the tool holding fixture (12). By a driving means, the holder carrying the gripper hands (29) is movable relative to a block displaceable transversly to the axis of the tool holding fixture (12) so that it may be moved in parallel to the axis of the tool holding fixture (12) while the wrench (51) is in engagement with the locking screw (35). Therefore, it is possible to perform a complete tool interchange without the need of disengaging wrench (51) and locking screw (35). As a result, the tool changing operation is speeded up along with a simpler control thereof.

9 Claims, 4 Drawing Sheets

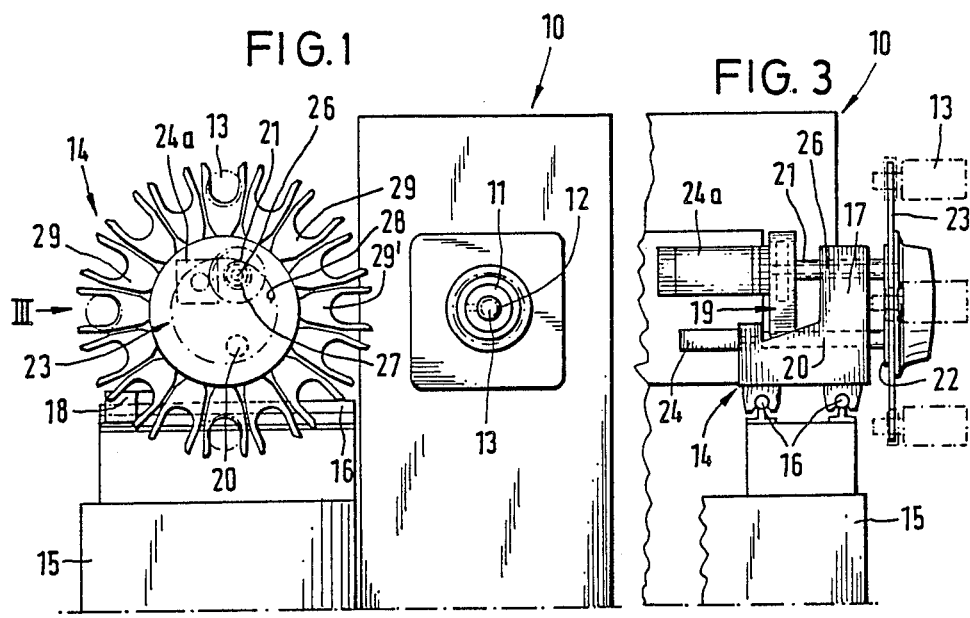
FIG. 1
FIG. 3
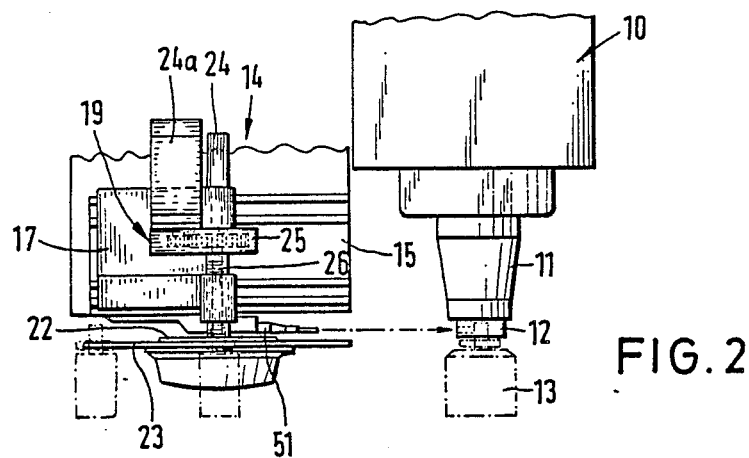
FIG. 2

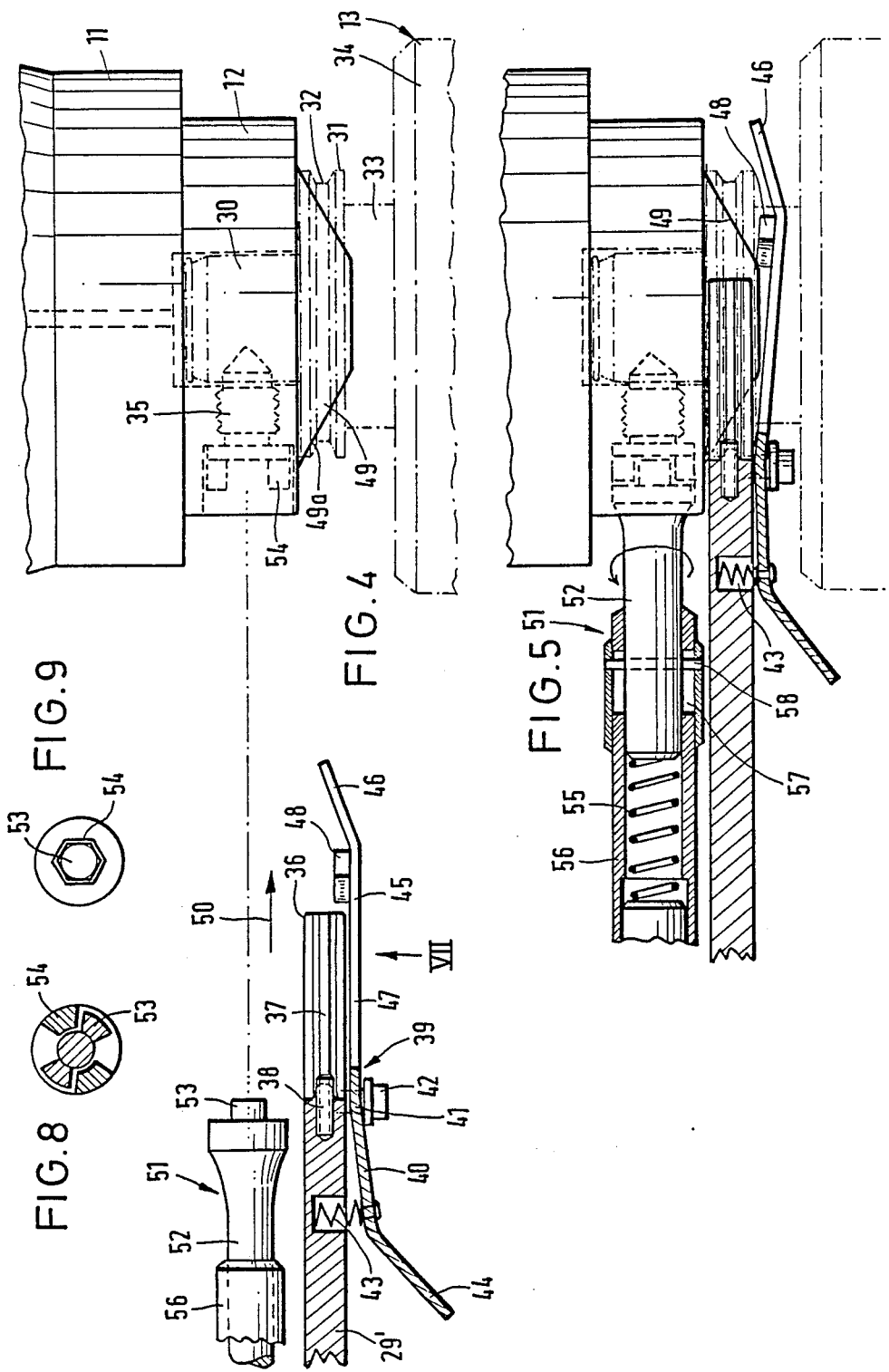

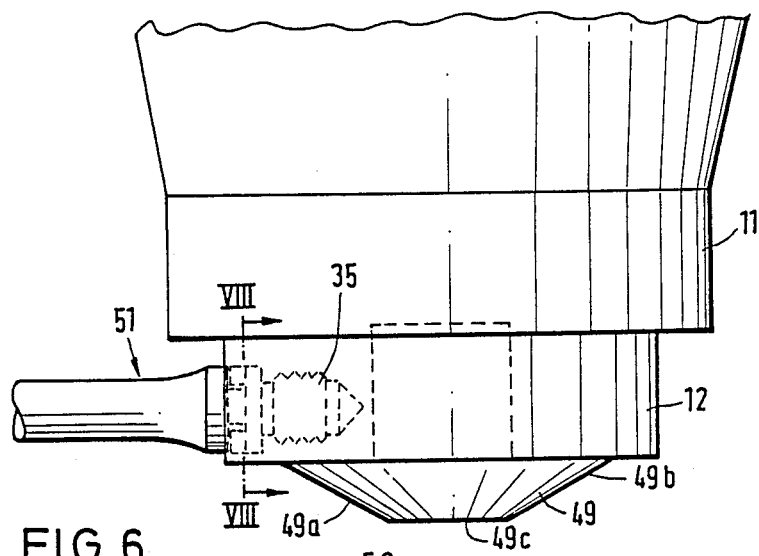
FIG. 6
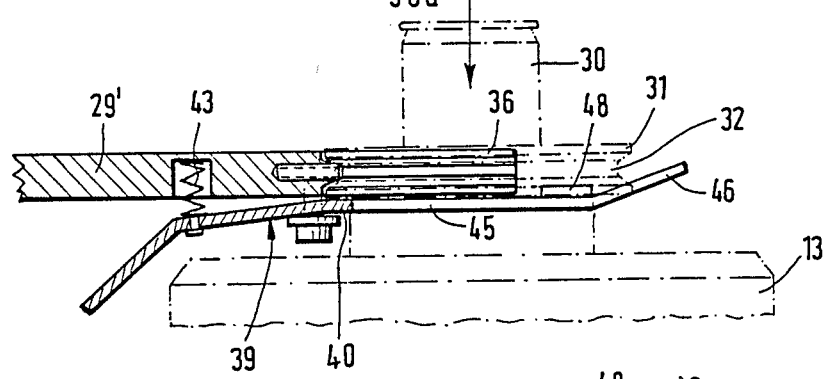
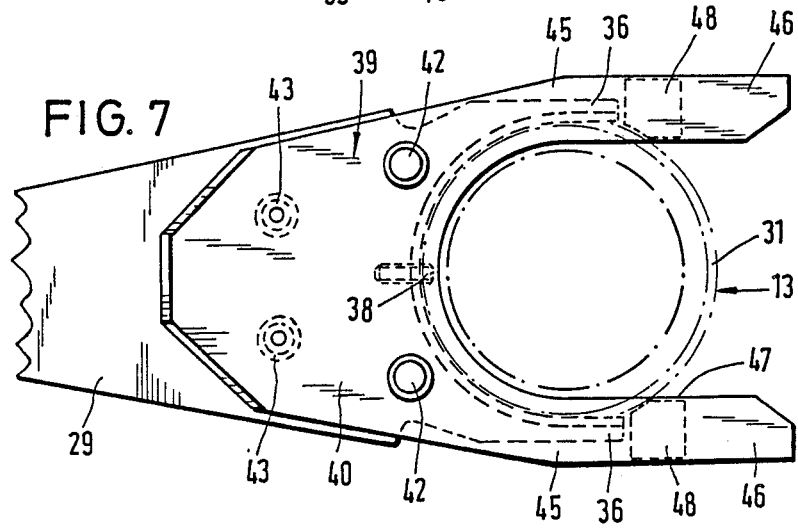
FIG. 7

TOOL CHANGER FOR MACHINE TOOL

The invention relates to a tool changer for a machine tool which has a tool holding fixture, comprising a rotatable holder including a plurality of gripper hands for engaging the flange of a tool, a first moving means to move the holder between a return position and an aligning position in which a gripper hand is located ahead of the tool holding fixture, and a second moving means to move the holder in parallel to the axis of the tool holding fixture.

Machine tools designed to realise by means of different tools various machining operations on workpieces call for a tool changer capable of removing a tool from the tool holding fixture of the machine tool, of taking said tool away from the machine tool and of introducing another tool into said tool holding fixture. According to various tool changing systems in practice, the shape of the rear holding portion of the tool is adapted to the shape of the tool holding fixture which, for instance, may be of a conical or cylindrical design. The machine tool contains an arresting means by which a tool inserted into the tool holding fixture may be locked automatically or manually.

Upon the unlocking of the tool in the machine, the holder of the tool changer must be capable of extracting the tool from the tool holding fixture and of removing said tool from the position of alignment. Further, it must be capable of placing another tool into the position of alignment and of subsequently fitting it in the tool holding fixture. In view of this object, there have been known tool changers equipped with a number of gripper hands adapted to retain and to release the tool. As a rule, such release systems require a mechanical control to seize the tool or to retain and to release it respectively. Moreover, it must be possible to manually insert such a tool into the gripper hand. To fix a tool in the tool holding fixture and to unlock it there, a locking screw provided in the tool holding fixture must be turned. In case of the known machine tools, the tightening and releasing of the locking screw is a time-taking operation because the wrench required for rotating the locking screw is to be newly applied to the locking screw whenever a tool is removed from the tool holding fixture and whenever a new tool is to be mounted in the tool holding fixture.

It is an object of the invention to provide a tool changer of the foregoing type in which the clamping and releasing of a tool in the holding fixture is performed automatically and as quickly as possible, while, between the removal of a tool from the tool holding fixture and the insertion of a new tool in the latter, the screwing means or wrench need not be relocated.

According to a preferred embodiment of the invention, the wrench is secured to a movable block so that it engages the locking screw if the block is moved into a position in which a gripper hand of the holder is in the alignment position ahead of the tool holding fixture. In said alignment position, the holder may be advanced, turned or returned without requiring a disengagement between wrench and locking screw. Therefore, during the total changing operation, when a tool is replaced by another, the wrench may be kept in engagement with the locking screw. As a result thereof, the time required for the tool interchange is reduced and the control of the tool changer is simplified.

Particular note should be taken of the embodiment of the invention in which the locking elements overengage the flange in the space between the fingers of a gripper hand in order to retain said flange circumferentially. Therefore, it is possible to also use the locking means in connection with tools which are not provided with an uninterrupted circumjacent flange. Further, due to the locking elements, the flange is fixed in that it is encompased circumferentially within an angular range of more than 180° by the fingers of the gripper hand and by the locking elements. By this means a firm, well defined seat of the tool on the holder is ensured. The locking elements mounted rigidly at the fork-shaped locking means do not require a separate control or actuation. Hence, a reliable, troublefree performance of the tool changer is achieved. In addition, the accuracy concerning the positioning of the tools in the tool magazine is increased.

An embodiment of the invention will be explained hereunder in more detail with reference to the drawings in which FIG. 1 is a front view of the tool changer with machine tool, FIG. 2 is a plan view of FIG. 1, FIG. 3 is a side view of FIG. 1 from the direction of arrow III, FIG. 4 is a scaled up plan view partly broken up of a gripper hand moving towards the tool holding fixture, FIG. 5 is a view similar to that of FIG. 4, the gripper hand receiving the tool and the wrench being rotated to release said tool, FIG. 6 is a view similar to that of FIG. 4 and FIG. 5, to show the removal of the tool from the tool holding fixture, FIG. 7 is a view of the locking means from the direction of arrow VII of FIG. 4, FIG. 8 is a section along line VIII—VIII of FIG. 6, FIG. 9 is another embodiment of the coupling between wrench and locking screw, FIG. 10 similar to FIG. 5 shows the gripper hand engaging a tool with a steep cone.

The drawings illustrate a machine tool 10 which, as to type and construction, is not subjected to any limitations. For instance, the machine tool under consideration may comprise a movable or stationary machine body, or a machining center or the like. The machine tool 10 contains a rotatable spindle 11 having secured to its front end the tool holding fixture 12 adapted for fixing a tool 13 which, in case of a rotating spindle 11, may act on a (non-illustrated) workpiece. The different tools 13 are drafted only schematically in the drawings.

On one side of the machine tool 10 and closely arranged thereto, there is a tool changer 14 which comprises a base 15 either situated on the ground or secured to the machine body of the machine tool. Two parallel horizontal guide bars 16 mounted on base 15 extend transversely to the axis of the tool holding fixture 12 for guiding a block 17 movable therealong by a driving means 18.

In block 17, a rigid frame 19 is guided to be linearly displaceable, the frame 19 comprising two parallel guide bars 20, 21 which, in superimposed arrangement, extend in parallel to the axis of the tool holding fixture 12. The guide bars 20,21 are guided in guide bores of block 17. The front ends of the guide bars 20 and 21 are interconnected by a bearing means 22 supporting a holder 23 in the form of a wheel rotatable about a horizontal axis. A driving means 24 mounted on block 17 is adapted to displace frame 19 relative to the latter.

The holder 23 is rotated about the axis of the bearing means 22 by way of a rotary drive 24a which is fixed to frame 19 to rotate via a gear 25 the shaft 26, extending coaxially through the hollow guide bar 21. Its front end is provided with a pinion 27 (FIG. 1) whose toothing meshes with that of an internal crown gear 28 of the holder 23. Upon actuation of the rotary drive 24a, the holder 23 is rotated relative to frame 19 and around the bearing means 22. Said rotary drive 24a may be either a customary torque motor or a stepping motor.

A plurality of radially projecting gripper hands 29 is secured to the holder 23 and in a plane extending transversely to the axis of the tool holding fixture, each of the gripper hands containing two parallel fingers and consisting of a rigid sheet metal having an aperture radially directed to the outside and confined by two fingers. Between the outwardly projecting fingers of the gripper hand, a tool 13 may be introduced.

FIG. 4 shows the holding region at the rearward end of tool 13. At said rearward end of tool 13, there is a shaft 30 which may be inserted into a corresponding bore of the tool holding fixture 12. Ahead of said shaft 30, there is a flange 31 whose peripheral surface contains a circumjacent groove 32 having oblique flanks. In advance of said flange 31, there is a cylindrical section 33 followed by the main portion 34 of the tool. The arrangement of all sections 30,31,32 as well as of 33 and 34 is coaxial.

In the embodiment of FIGS. 4 to 6, the rearward shaft 30 is arrested in the tool holding fixture 12 by a laterally introduced locking screw 35, the locking screw 35 being screwed into a radial thread bore of the holding fixture 12 and projecting into a lateral recess of shaft 30. In this embodiment, the axis of the rotatable holder 23 of the tool changer 14 is provided at the same height with the axis of the tool holding fixture 12. In any case, the axis of holder 23 is movable radially relative to the axis of the tool holding fixture 12. In each position in which the rotatable holder 23 may stop, a gripper hand 29 is at the same height with the tool holding fixture 12, the gripper hand 29' being in operative position.

FIG. 4 shows the situation in which, relative to block 17, the holder 23 is in the return position in which all of the gripper hands 28 are located in the same vertical plane as the flange 31 of a tool mounted in the tool holding fixture 12. If, by actuating the motor 18, block 17 is moved towards the tool holding fixture 12, the fingers 36 of the gripper hand 29' encompass flange 31 of tool 13 (FIGS. 4 and 5). Inside the receptacle of the gripper hand 29, there is a stem 37 adapted to engage the groove 32 of flange 31. A tool encompassed by gripper hand 29' may be removed only radially from the gripper hand. To mount the tool 13 in a defined rotary position in the gripper hand 29', a bolt-shaped projection 38 is provided at the bottom of the receptacle of the gripper hand 29' which bolt may penetrate into a (non-illustrated) lateral recess of groove 32.

To arrest the tool 13 at the gripper hand, each gripper hand is provided with a locking means 39 which consists of a rigid plate 40 mounted on the gripper hand outside averted from the tool holding fixture 12, the plate having a vertical bend line 41 within the reach of which screws 42 are fixed to the gripper hand 29. The part of plate 40 which is remote from the axis of holder 23 extends obliquely to the outside, and springs 43 urging thereagainst are supported by the gripper hand 29. The oblique region is followed by another region 44 bent outwardly.

Plate 40 forms a rocker which, relative to the gripper hand 29, is swivelable within limits about the broken line 41. In order to realise said swivel movement, screws 42 are of the collar type which admit the required play. Springs 43 press the legs 45 provided on the opposite side of the rocker against the outsides of the two fingers 36 of the gripper hand 29, said legs 45 projecting beyond fingers 36 and their ends being provided with a bent region 46 pointing towards the tool holding fixture 12. Between legs 45 of plate 40, a laterally open recess 47 is adapted to receive the cylindrical portion 33 of tool 13, the recess 47 not being large enough to receive flange 31. On the sides of the two legs 45 confronted with the tool holding fixture 12, there are provided projecting locking elements 48.

A connecting link guide 49 in the form of a plate projecting from the front end of the tool holding fixture 12 is secured to the latter. Spindle 11 of the machine tool is so controlled that it is stopped in a defined angular position in which the connecting link guide 49 is positioned for instance, horizontally above the aperture to receive shaft 31.

If gripper hand 29' is advanced radially to the tool holding fixture 12 from the position shown in FIG. 4 in direction of arrow 50, the external part 46 of the locking means 39 abuts against the oblique butting edge 49a of the connecting link guide 49 thus tilting outwardly about the bent line 41 the locking means 39 against the action of springs 43, with the result that the locking elements 48 do not collide with flange 31. According to FIG. 5, the locking elements 48 are moved past flange 31. If the gripper hand 29' reaches the position shown in FIG. 5, part 46 has already left the connecting link guide 49 so that the springs 43 axially press legs 41 against fingers 36, while the locking elements 48 are pushed over the flange 31 of the tool 13.

As evident from FIG. 7, fingers 36 encompass half the periphery of flange 31, while the locking elements 48 engage the other half of said flange periphery so that in the position of the locking means 39 shown in FIG. 6, flange 31 is locked between the fingers of gripper hand 29' and is prevented by the locking elements 48 from getting away radially from the gripper hand. By actuating the driving means 24 in such a situation, frame 19 may be advanced relative to block 17 so that holder 23 including all of the gripper hands 29,29' is axially removed from the tool holding fixture 12 (FIG. 6) by taking along tool 13.

On the other hand, a new tool may be mounted in the empty tool holding fixture 12 in that, by rotating holder 23' the gripper hand 29 supporting said tool is placed into position 29' while subsequently, by actuating the driving means 29, the frame 19 together with the holder 23 is moved towards the tool holding fixture 12. Said movement is in counterdirection to arrow 50a of FIG. 6. If shaft 30 has penetrated the aperture of the tool holding fixture 12, the front flank 49c of the connecting link guide 49 abuts against one leg 45 of the locking means 39 thus disengaging the locking elements 48 and flange 31. In subsequently removing radially gripper hand 29' from flange 31, part 46 of the upper leg 45 slides along flanks 49b,49c,49a of the connecting link guide 49 thus ensuring that the locking elements 49 do not catch again.

In the locking position shown in FIG. 6, the front face of flange 31 adjoins the rear side of metal sheet 40 which, in the bottom region of recess 45, simultaneously forms a stop for flange 31.

If it is intended to insert a tool 13 into one of the gripper hands on the holder, this may be simply achieved by one-hand operation in that the tool with flange 31 is pressed against part 46 to thus open the locking means 39. The tool then may be inserted between the fingers of the respective gripper hand. Upon reaching its correct position, the external half of the periphery of the flange is locked by the catching locking elements 48 to thus retain undetachably the tool 13 with the gripper hand.

In the illustrated embodiment, tool 13 is locked in tool holding fixture 12 by means of locking screw 35. To automatically operate the locking screw 35, wrench 51 provided on block 17 projects from the latter in radial alignment with the tool holding fixture 12. Wrench 51 comprises a shaft 52 whose external end is fitted with coupling means 53 which, in case of the adjusting movement of block 17 towards the tool holding fixture 12 along the guide bars 16, engage corresponding coupling means 54 of the locking screw 35. As soon as the gripper hand 29' has overengaged flange 31 of the tool, the coupling means 53 and 54 are in a mutual engagement. At that moment, by turning wrench 51 with the use of a (non-illustrated) driving means, the locking screw 35 may be either loosened or tightened, the driving means turning a sleeve 56 into which shaft 52 is introduced axially, said sleeve 56 accomodating a spring 55 to axially support shaft 52 which is nonrotatingly connected to the sleeve 56 by means of a cross-pin 58 movable in a longitudinal guide 57 of sleeve 56. If coupling means 53 and 54 are not mutually engaged, shaft 52 recedes by compressing spring 55. By turning subsequently shaft 52, coupling means 53 and 54 are engaged by snap-in locking.

If holder 23 is advanced together with frame 19 while the gripper hand 29' is removed from the tool holding fixture 12, the wrench 51 is kept in engagement with locking screw 35, as shown in FIG. 6. The wrench being mounted on block 17, which only moves radially (relative to the tool holding fixture 12), it does not move axially together with frame 19. Hence, during the total tool changing, wrench 51 is kept engaged with the locking screw 35. FIG. 10 schematically shows the use of the tool changer in case of another tool system in which tool 13' has a conical shaft 30' carrying at its rear end a head 59 adapted to be encompassed inside the machine tool by a locking mechanisn. A locking screw need not be provided accordingly nor does the tool changer comprise a wrench 51.

What is claimed is:

1. Tool changer for a machine tool having a tool holding fixture, comprising:
   at least one rotatable holder having a plurality of gripper hands for engaging a tool,
   a first moving means for moving the holder between a return position and an aligning position in which one of the gripper hands is located ahead of the tool holding fixture,
   a second moving means for moving the holder in parallel to the axis of the tool holding fixture,
   a block for carrying the holder,
   a wrench supported by the block, the wrench being drivable rotatingly and projecting towards the tool holding fixture,
   a locking screw provided at the tool holding fixture, the locking screw and wrench being disposed so that movement of the holder to the aligning position brings the locking screw and the wrench into abutment,
   coupling means associated with the wrench for turning the locking screw (35),
   driving means for moving the holder relative to the block and in parallel to the axis of the tool holding fixture while the wrench remains in engagement with the locking screw.

2. Tool changer according to claim 1, wherein the wrench is supported axially by a spring.

3. Tool changer according to claim 1, wherein the holder is a rotatable wheel to which the plurality of gripper hands are secured and wherein the axis of the wheel is arranged at a height equal to that of the tool holding fixture.

4. Tool changer according to claim 1, further comprising:
   a frame,
   a linear guide associated with the block,
   the holder being provided to the axis of the tool holding and being guided in parallel to the axis of the tool holding fixture by means of the linear guide.

5. Tool changer according to claim 1, further comprising:
   a base,
   a linear guide oriented tranversely to the tool holding fixture,
   the block being guided on the base by the linear guide in a direction transverse to the tool holding fixture.

6. Tool changer according to claim 1, further comprising:
   a rigid frame including parallel guide rods displaceable on the block, the holder being rotatably supported on the rigid frame, and
   a rotary drive supported on the frame and having a shaft which rotatably drives the holder.

7. Tool changer according to claim 6, wherein at least one of the parallel guide rods is hollow and the shaft extends through the hollow guide rod.

8. Tool changer according to claim 1, wherein the tool includes a flange, the tool changer further comprising:
   a locking means supported on each of the gripper hands, the locking means having at least one locking element for overengaging the flange of the tool,
   a connecting link guide mounted on the machine tool for pressing the locking element axially out of the range of the flange,
   each of the gripper hands being configured to encompass substantially half of the periphery of the flange of the tool and the locking element being configured to engage the other half of the periphery of said flange when one of the gripper hands is moved to the front of the tool holding fixture.

9. Tool changer according to claim 8, wherein the locking means comprises:
   a plate provided with a recess for lateral passage of the tool,
   at least two legs,
   locking elements on each of the legs, and
   flexible pressing means for pressing the plate against the outside of each gripper hand.

* * * * *